(12) United States Patent
Were et al.

(10) Patent No.: US 11,708,798 B2
(45) Date of Patent: Jul. 25, 2023

(54) USING A VARIABLE GEOMETRY TURBOCHARGER TO CONTROL AN EXHAUST GAS TEMPERATURE AND A PRESSURE OF AN INTAKE MANIFOLD

(71) Applicant: Caterpillar Inc., Deerfield, IL (US)

(72) Inventors: Samuel Were, Peoria, IL (US); James Mutti, Germantown Hills, IL (US); Rajesh Nair, Mossville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/206,555

(22) Filed: Mar. 19, 2021

(65) Prior Publication Data

US 2021/0207548 A1 Jul. 8, 2021

Related U.S. Application Data

(63) Continuation of application No. 16/562,193, filed on Sep. 5, 2019, now Pat. No. 10,982,605.

(51) Int. Cl.
*F02D 41/00* (2006.01)
*F01N 5/04* (2006.01)
*F02B 37/24* (2006.01)

(52) U.S. Cl.
CPC .......... *F02D 41/0007* (2013.01); *F01N 5/04* (2013.01); *F02B 37/24* (2013.01); *F01N 2900/1404* (2013.01)

(58) Field of Classification Search
CPC ............. F02D 41/0002; F02D 41/0005; F02D 41/0007; F02D 41/18; F02D 9/06; F02D 2200/101; F02D 2200/04; F02D 2200/0406; F01N 5/04; F01N 2900/1404; F01N 2900/1406; F02B 37/24
See application file for complete search history.

(56) References Cited

U.S. PATENT DOCUMENTS

| 6,272,859 B1 | 8/2001 | Barnes et al. |
| 6,314,735 B1 | 11/2001 | Kolmanovsky et al. |
| 7,658,068 B2 | 2/2010 | Mulloy et al. |

(Continued)

FOREIGN PATENT DOCUMENTS

WO WO-2014051496 A1 * 4/2014 ........... F01N 3/0235

OTHER PUBLICATIONS

Copending U.S. Appl. No. 16/562,193, filed Sep. 5, 2019.

*Primary Examiner* — Loren C Edwards
(74) *Attorney, Agent, or Firm* — Harrity & Harrity, LLP (57) ABSTRACT

An engine control module (ECM) may obtain information concerning a speed of an engine, information concerning an exhaust gas temperature, information concerning an engine airflow rate, information concerning a pressure of an intake manifold associated with the engine, and information concerning a requested amount of engine braking power. The ECM may cause one or more components of a variable geometry turbocharger (VGT) to adjust based on the information concerning the speed of the engine, the information concerning the exhaust gas temperature, and the information concerning the engine airflow rate. Additionally, or alternatively, the ECM may cause the one or more components of the VGT to adjust based on the information concerning the pressure of the intake manifold associated with the engine and the information concerning the requested amount of engine braking power.

20 Claims, 5 Drawing Sheets

(56) References Cited

U.S. PATENT DOCUMENTS

| | | | |
|---|---|---|---|
| 8,151,567 B2 | 4/2012 | Rollinger et al. | |
| 8,302,385 B2 * | 11/2012 | Sujan | F02D 41/029 60/285 |
| 8,387,370 B2 * | 3/2013 | Van Nieuwstadt | F02D 41/029 60/299 |
| 9,322,363 B2 | 4/2016 | Kostrzewski | |
| 2002/0116111 A1 * | 8/2002 | Sayman | B60W 10/196 701/110 |
| 2008/0016853 A1 | 1/2008 | Zhang et al. | |
| 2008/0295485 A1 * | 12/2008 | Wiley | F02D 41/0235 123/321 |
| 2011/0011081 A1 | 1/2011 | Quigley | |
| 2014/0214308 A1 * | 7/2014 | Mulloy | F02D 13/04 701/110 |
| 2017/0058787 A1 * | 3/2017 | Alexandru | F02D 9/06 |
| 2018/0187615 A1 | 7/2018 | Lahti et al. | |

* cited by examiner

USING A VARIABLE GEOMETRY TURBOCHARGER TO CONTROL AN EXHAUST GAS TEMPERATURE AND A PRESSURE OF AN INTAKE MANIFOLD

RELATED APPLICATION

This application is a continuation of U.S. patent application Ser. No. 16/562,193, filed Sep. 5, 2019, which is incorporated herein by reference in its entirety.

TECHNICAL FIELD

The present disclosure relates generally to controlling an exhaust gas temperature of an engine and a pressure of an intake manifold associated with the engine and, more particularly, to using a variable geometry turbocharger to control the exhaust temperature of the engine and the pressure of the intake manifold.

BACKGROUND

When operating, an engine of a machine, such as a wheel loader, a dozer, and other heavy equipment, may produce an exhaust gas that includes particulate matter (e.g., soot) and/or other emissions, such as $NO_x$. In some cases, the engine may include a particulate collection device, an exhaust aftertreatment device, and/or the like to remove and/or convert particulate matter and/or the other emissions in the exhaust gas. The particulate collection device, the exhaust aftertreatment device, and/or the like may use heat from the exhaust gas, in conjunction with an oxidation catalyst (e.g., a diesel oxidation catalyst (DOC)), to facilitate removing and/or converting the particulate matter and/or other emissions. However, under certain operating conditions (e.g., when the engine is idling, when environmental temperatures are low, and/or the like), an exhaust gas temperature may fall below a minimum operating temperature for the particulate collection device, the aftertreatment device, and/or the like to operate in an efficient and/or effective manner.

One attempt to control an exhaust temperature in lean burn engines is disclosed in U.S. Pat. No. 6,314,735 that issued to Kolmanovsky et. al. on Nov. 13, 2001 ("the '735 patent"). In particular, the '735 patent discloses a control strategy for adjusting a temperature of an exhaust gas entering an aftertreatment device by carefully controlling a turbine inlet vane position of a variable geometry turbocharger. Per the '735 patent, movement of the vane position effects the exhaust gas temperature in a manner that allows control of the exhaust gas temperature. For example, as disclosed in the '735 patent, it may be that the exhaust gas temperature is decreased by opening the inlet vane position and increased by closing the inlet vane position.

While the '735 patent may disclose a method for adjusting an exhaust gas temperature by opening or closing an inlet vane position of a variable geometry turbocharger, the '735 patent does not disclose evaluating other parameters associated with operation of an engine (e.g., a speed of the engine, an air intake rate of the engine, a pressure of an intake manifold associated with the engine, and/or the like) to determine when to adjust the inlet vane position of the variable geometry turbocharger. Furthermore, the '735 patent does not disclose adjusting the inlet vane position, or any other component, of the variable geometry turbocharger to control any particular parameter, of the other parameters, associated with operation of the engine.

Accordingly, the system of the present disclosure solves one or more of the problems set forth above and/or other problems in the art.

SUMMARY

According to some implementations, a method may include obtaining, by an engine control module (ECM), information concerning a speed of an engine, information concerning an exhaust gas temperature, information concerning an engine airflow rate, information concerning a pressure of an intake manifold associated with the engine, and information concerning a requested amount of engine braking power; and causing, by the ECM, one or more components of a variable geometry turbocharger (VGT) to adjust based on at least two of the information concerning the speed of the engine, the information concerning the exhaust gas temperature, the information concerning the engine airflow rate, the information concerning the pressure of the intake manifold associated with the engine, or the information concerning the requested amount of engine braking power.

According to some implementations, a device may include one or more memories; and one or more processors, communicatively coupled to the one or more memories, configured to: determine a speed of an engine; determine an exhaust gas temperature; determine an engine airflow rate; determine a pressure of an intake manifold associated with the engine; determine a requested amount of engine braking power; and cause one or more components of a VGT to adjust based on: the speed of the engine, the exhaust gas temperature, and the engine airflow rate; or the pressure of the intake manifold associated with the engine and the requested amount of engine braking power.

According to some implementations, a system may include an engine; an intake manifold; a VGT that includes adjustable vanes; a throttle valve; a sensor system; and an ECM configured to: receive, from the sensor system, information concerning a speed of the engine, information concerning an exhaust gas temperature, information concerning an engine airflow rate, information concerning a pressure of the intake manifold, and information concerning a requested amount of engine braking power; and cause the adjustable vanes of the VGT to adjust, or the throttle valve to adjust, based on: the information concerning the speed of the engine, the information concerning the exhaust gas temperature, and the information concerning the engine airflow rate; or the information concerning the pressure of the intake manifold and the information concerning the requested amount of engine braking power.

DETAILED DESCRIPTION

This disclosure relates to an engine control module (ECM) controlling a variable geometry turbocharger (VGT) of an engine to control an exhaust gas temperature (e.g., of an exhaust gas produced by an engine) and/or a pressure of an intake manifold (e.g., an intake manifold associated with the engine that produces the exhaust gas). The ECM and/or the VGT, as described herein, have universal applicability to any machine utilizing such an ECM and/or VGT. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, aerial equipment, or marine equipment.

Figure 1:
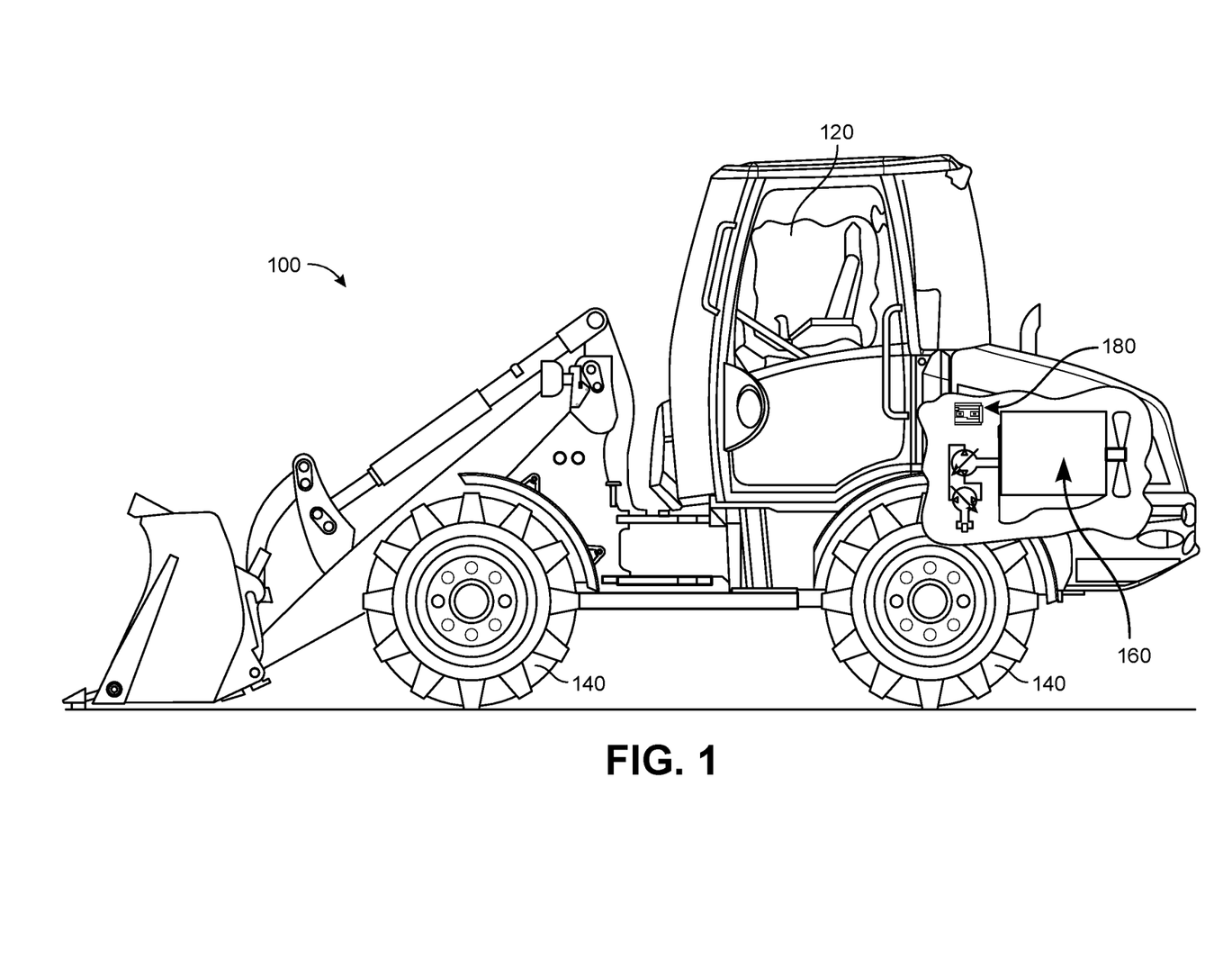
FIG. 1 is diagram of an example machine described herein.

FIG. 1 is a diagram of an example machine 100 described herein. For example, machine 100 may include a mobile machine, such as the wheel loader shown in FIG. 1, or any other type of mobile machine. Machine 100 may include an operator station 120, one or more traction devices 140 (sometimes referred to as ground engagements), an engine 160 operatively connected to provide power to drive at least one of traction devices 140, and an ECM 180 connected to one or more components of machine 100. The ECM 180 may perform operations related to controlling the VGT to control an exhaust gas temperature and/or a pressure of an intake manifold, as described in more detail elsewhere herein.

As indicated above, FIG. 1 is provided as an example. Other examples may differ from what is described in connection with FIG. 1.

Figure 2:
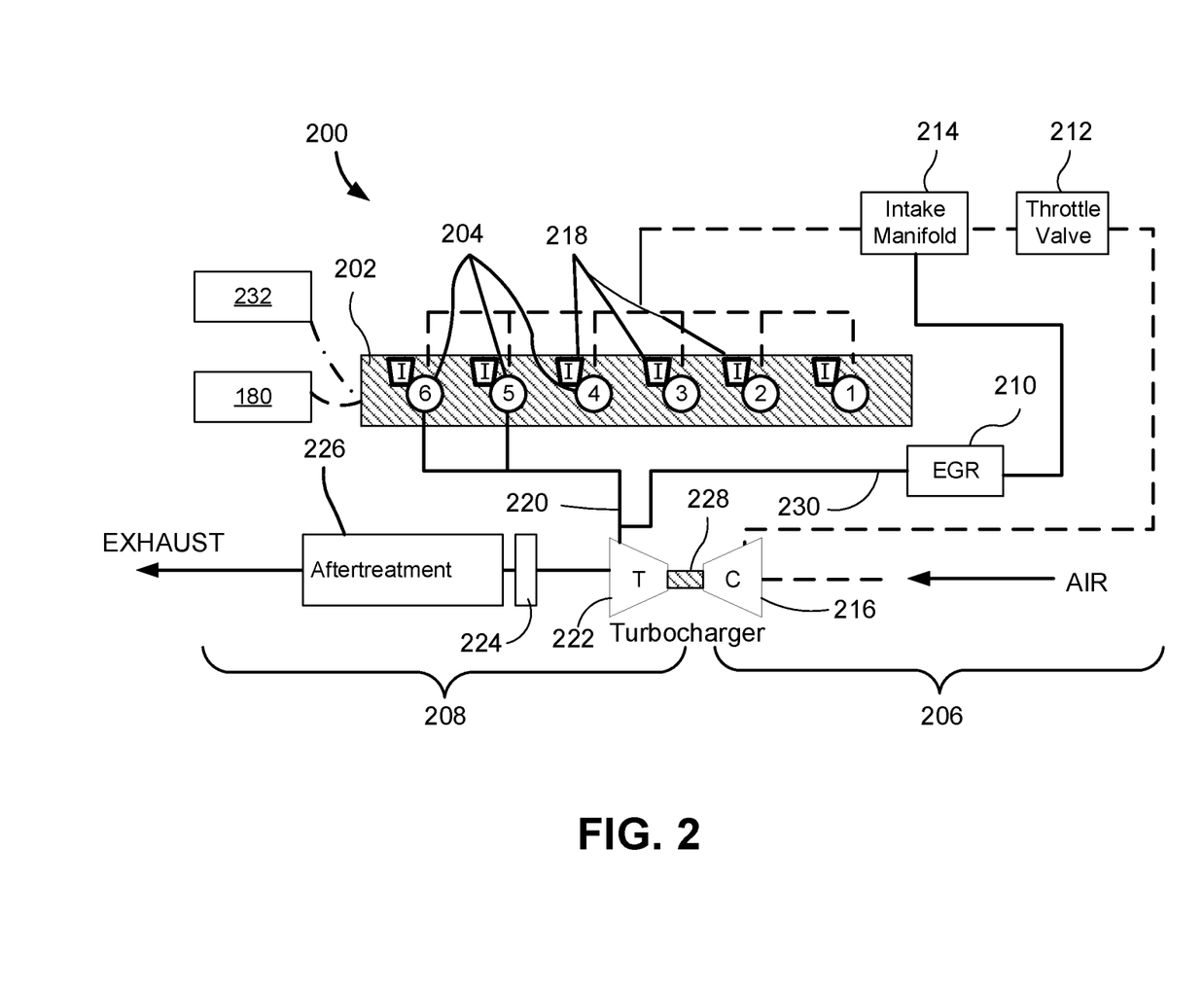
FIG. 2 is a diagram of an example engine system described herein.

FIG. 2 is a diagram of an example engine system 200 described herein. The engine system 200 may include a compression ignition, internal combustion engine (e.g., engine 160). However, the engine system 200 may include any other type of internal combustion engine, such as, for example, a spark, laser, a plasma ignition engine, and/or the like. The engine system 200 may be fueled by such fuels as distillate diesel fuel, biodiesel, dimethyl ether, gaseous fuels, such as hydrogen, natural gas, and propane, alcohol, ethanol, and/or any combination thereof.

Engine system 200, of FIG. 2, may include an engine block 202 with a plurality of cylinders 204 (engine block 202 of FIG. 2 is shown with six cylinders 204, labeled 1-6). A piston assembly may be included within each of cylinders 204 to form a combustion chamber within each cylinder 204. Engine system 200 may include any number of combustion chambers, and the combustion chambers may be disposed in an in-line configuration, a "V" configuration, or in any other suitable configuration. Furthermore, the engine system 200 may consume one or more consumable resources (e.g., a fuel (e.g., gasoline, diesel fuel, and/or the like), a diesel exhaust fluid (DEF), one or more coolants, one or more lubricants (e.g., an oil, a grease, and/or the like), and/or the like) during operation (e.g., due to combustion in the engine block 202).

Engine system 200 may include multiple systems. For example, as shown in the example of FIG. 2, engine system 200 may include an air intake or air induction system 206, an exhaust system 208, and/or an exhaust gas recirculation (EGR) system 210. Air induction system 206 may be configured to direct air, or an air and fuel mixture (e.g., of air and another gas, such as exhaust gas) into engine system 200 for subsequent combustion. Exhaust system 208 may exhaust or release byproducts of the combustion to an atmosphere external to engine system 200. A recirculation loop of the EGR system 210 may be configured to direct a portion of the exhaust gases from exhaust system 208 back into air induction system 206 for subsequent combustion.

Air induction system 206 may include multiple components that cooperate to condition and introduce compressed air into cylinders 204. For example, air induction system 206 may include a throttle valve 212 and/or an intake manifold 214 located downstream of one or more compressors 216. The throttle valve 212 may selectively regulate (e.g., restrict) a flow of air into intake manifold 214. Intake manifold 214 may mix air and exhaust gas to create an air and exhaust gas mixture that is directed to the plurality of cylinders 204. The air induction system 206 feeds variable valve actuators 218 associated with respective ones of cylinders 204. Air induction system 206 may include an air cooler, a filtering component, a compressor bypass component, and/or the like.

Exhaust system 208 may include multiple components that cooperate to condition and direct exhaust gas from cylinders 204 to the atmosphere. For example, exhaust system 208 may include an exhaust passageway 220, one or more turbines 222 driven by exhaust gas flowing through exhaust passageway 220, a particulate collection device 224, such as a diesel particulate filter (DPF) located downstream of turbine 222, and/or an exhaust aftertreatment device 226 (e.g., an aftertreatment selective catalytic reduction (SCR) device) fluidly connected downstream of particulate collection device 224. Exhaust system 208 may include one or more bypass components, an exhaust compression or restriction brake, an attenuation device, additional exhaust treatment devices, and/or the like.

Turbine 222 may be located to receive exhaust gas leaving engine system 200 and may be connected to the one or more compressors 216 of air induction system 206 by way of a common shaft 228. As exhaust gas exiting engine system 200 flows through turbine 222 and expands against vanes thereof, turbine 222 may rotate and drive the one or more compressors 216 to pressurize inlet air.

In some implementations, the one or more compressors 216, common shaft 228, and turbine 222 may form a turbocharger, such as a variable geometry turbocharger (VGT). Turbine 222 (hereinafter referred to as "VGT turbine 222") may include adjustable vanes such that a distance between the adjustable vanes may be changed to alter a performance of the VGT. For example, the adjustable vanes of VGT turbine 222 may be extended to a "closed" position or may be retracted to an "open" position, which may cause more or less air and/or exhaust gas from exhaust system 208 to enter into air induction system 206.

Particulate collection device 224 may be a DPF located downstream of VGT turbine 222 to remove particulate matter from the exhaust flow of engine system 200. Particulate collection device 224 may include an electrically conductive or non-conductive coarse mesh metal or porous ceramic honeycomb medium. As exhaust gas flows through the medium, particulates may be blocked by and trapped in the medium. Over time, the particulates may build up within the medium and, if unaccounted for, could affect engine performance by increasing exhaust backpressure. To minimize backpressure effects on engine performance, the collected particulates may be passively and/or actively removed through a regeneration process. When passively regenerated, the particulates deposited on the medium may chemically react with a catalyst, such as a diesel oxidation catalyst (DOC), that is coated on or otherwise included within particulate collection device 224 to lower the ignition temperature of the particulates. The temperature of the exhaust flow entering particulate collection device 224 needs to be high enough, in combination with the catalyst, to burn away the trapped particulates. When actively regenerated, heat from the exhaust is applied to the particulates deposited on the filtering medium to elevate the temperature thereof to an ignition threshold.

Exhaust aftertreatment device 226 may receive exhaust gas from VGT turbine 222 and trap or convert particular constituents (e.g., NON) in the gas stream. In one example, exhaust aftertreatment device 226 may embody a selective catalytic reduction (SCR) device having an oxidation catalyst located downstream from a reductant injector. The oxidation catalyst causes a chemical reaction to alter the composition of the exhaust. For example, a gaseous or liquid reductant, most commonly urea, or a water and urea mixture (e.g., a diesel emissions fluid (DEF)), may be sprayed or otherwise advanced into the exhaust upstream of the oxidation catalyst by a reductant injector. As the reductant is absorbed onto the surface of the oxidation catalyst, the reductant may react with $NO_x$ (NO and $NO_2$) in the exhaust gas to form water ($H_2O$) and elemental nitrogen ($N_2$). In some embodiments, a hydrolysis catalyst may be associated with the oxidation catalyst to promote even distribution and conversion of urea to ammonia ($NH_3$). Similar to the particulate collection device 224, the temperatures of the exhaust gas flow entering exhaust aftertreatment device 226 need to be high enough, in combination with the oxidation catalyst and the reductant, to react with the $NO_x$ (NO and $NO_2$) in the exhaust gas.

EGR system 210 may redirect gases from exhaust system 208 back into air induction system 206 for subsequent combustion. When utilizing EGR in a VGT diesel engine, as shown in FIG. 1, the exhaust gas to be recirculated may be removed upstream of the exhaust gas driven VGT turbine 222. For example, in many EGR applications, the exhaust gas may be diverted from the exhaust passageway 220 via an EGR conduit 230 to air induction system 206. Likewise, the recirculated exhaust gas may be re-introduced to the air induction system 206 downstream of the compressor 216.

Engine system 200 of FIG. 2 includes an ECM 180. ECM 180, as described herein, provides control of engine system 200 and/or components of engine system 200. ECM 180 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. ECM 180 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by ECM 180. ECM 180 may include a memory (e.g., a non-transitory computer-readable medium) capable of storing instructions, that when executed, cause the processor to perform one or more processes and/or methods described herein.

Sensor system 232 may provide measurements associated with various parameters used by ECM 180 to control engine system 200 and/or components of engine system 200. Sensor system 232 may include physical sensors and/or any appropriate type of control system that generates values of sensing parameters based on a computational model and/or one or more measured parameters. As used herein, sensing parameters may refer to those measurement parameters that are directly measured and/or estimated by one or more sensors (e.g., physical sensors, virtual sensors, and/or the like). Example sensors may include temperature sensors (e.g., to measure a temperature of exhaust gas at VGT turbine 222, particulate collection device 224, exhaust aftertreatment device 226, and/or the like), speed sensors (e.g., to measure a speed of the engine system 200 (e.g., in terms of revolutions per minute (RPM), a speed of machine 100 (e.g., in terms of kilometers per hour, miles per hour, and/or the like), and/or the like), chemical composition sensors (e.g., to measure an amount of $NO_x$ in exhaust gas), pressure sensors (e.g., to measure a pressure of the intake manifold 214 (e.g., an internal pressure of the intake manifold 214 in terms of kilopascals (kPa)), engine airflow sensors (e.g., to measure an engine airflow rate in terms of cubic meters per minute, cubic feet per minute, and/or the like), engine braking sensors (e.g., to measure a requested amount of engine braking power) and/or the like. Sensing parameters may also include any output parameters that may be measured indirectly by physical sensors and/or calculated based on readings of physical sensors.

Sensor system 232 may be configured to coincide with ECM 180, may be configured as a separate control system, and/or may be configured as a part of other control systems. Further, ECM 180 may implement sensor system 232 by using computer software, hardware, or a combination of software and hardware.

As indicated above, FIG. 2 is provided as an example. Other examples may differ from what is described in connection with FIG. 2.

Figure 3:
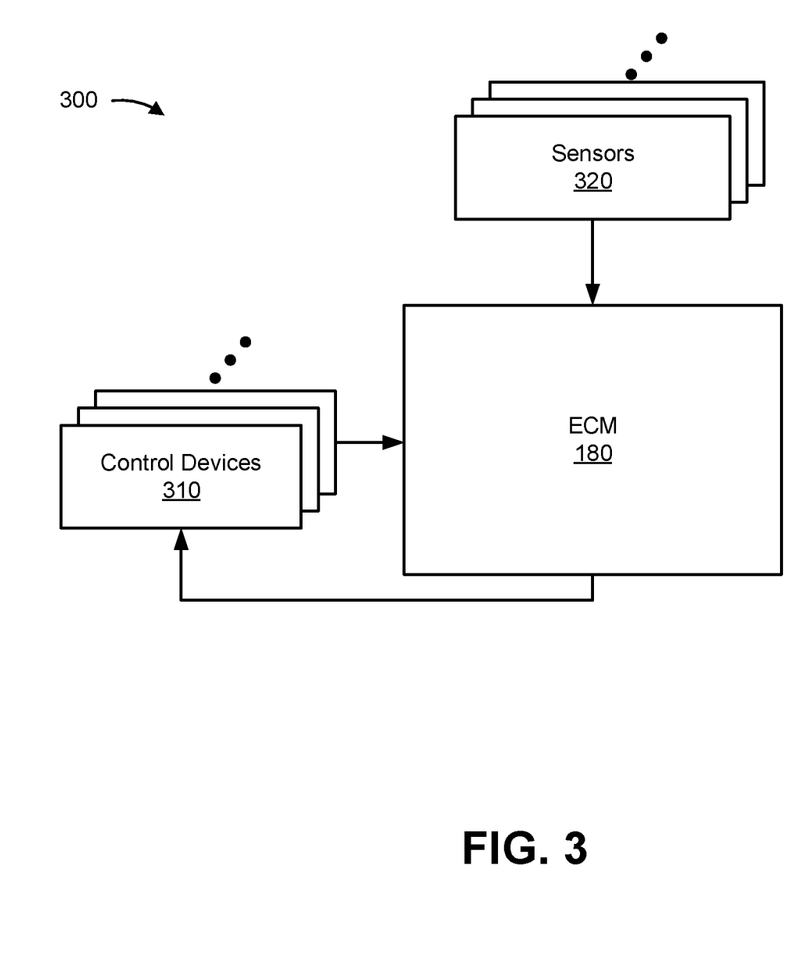
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more control devices 310 (referred to individually as "control device 310" and collectively as "control devices 310") and one or more sensors 320 (referred to individually as "sensor 320" and collectively as "sensors 320") and ECM 180. Devices and/or components of environment 300 may interconnect via wired connections, wireless connections, or a combination of wired and wireless connections.

Control device 310 may be any type of device that may be used by ECM 180 to control a performance feature of engine system 200. For example, control device 310 may include one or more actuators, switches, and/or the like that are capable of controlling a component of engine system 200. Control device 310 may be capable of causing adjustment of one or more components of the VGT, such as adjustable vanes of VGT turbine 222 (e.g., from a first vane position to a second vane position), causing adjustment of throttle valve 212 (e.g., from a first valve position to a second valve position), and/or the like.

Sensors 320 may include any type of sensor configured to measure operating conditions of engine system 200. Sensors 320 may be sensors of sensor system 232, as described herein. For example, the sensors 320 may include temperature sensors (e.g., to detect temperature of air, exhaust gas, a component, coolant, and/or the like), position sensors (e.g., to detect a position of a valve (e.g., throttle valve 212), an actuator, an engine part (e.g., a piston), a vane position of the adjustable vanes of the VGT, and/or the like), speed sensors (e.g., to detect an engine speed, a machine speed, a turbocharger speed (e.g., a VGT speed), and/or the like), pressure sensors (e.g., to detect a measure of compression of air or exhaust gas in a component of engine system 200 (e.g., in intake manifold 214), emissions sensors (e.g., to detect engine emission levels), load sensors (e.g., to detect an engine load), engine fuel sensors (e.g., to detect an amount of fuel for the engine), engine airflow sensors (e.g., to detect an engine airflow rate), braking sensors (e.g., to detect activation of a brake pedal, switch, and/or the like to reduce a speed of a machine (e.g., using engine braking)), and/or the like. In one example, sensors 320 may include one or more temperature sensors at (e.g., at an inlet, at an outlet, at an internal location, and/or the like) VGT turbine 222, particulate collection device 224, and/or exhaust aftertreatment device 226 to detect an exhaust gas temperature.

ECM 180 may include one or more devices configured to control one or more components of engine system 200. For example, ECM 180 may be configured to control the VGT of engine system 200 to control an exhaust gas temperature and/or a pressure of intake manifold 214. ECM 180 may control the one or more components of engine system 200 by sending one or more commands to control device 310.

ECM 180 may obtain information concerning engine system 200 from sensors 320 (e.g., directly from sensors 320 or via one or more other components or devices of engine system 200, such as a different ECM). For example, ECM 180 may obtain information concerning a speed of the engine of engine system 200, information concerning an exhaust gas temperature (e.g., a temperature of the exhaust gas at VGT turbine 222, particulate collection device 224 and/or exhaust aftertreatment device 226), information concerning an engine airflow rate, information concerning a pressure of intake manifold 214, and/or information concerning a requested amount of engine braking power to reduce a speed of machine 100 (e.g., an indication that engine braking is to be initiated at the requested amount of engine braking power to reduce the speed of machine 100 (e.g., based on an operator of machine 100 interacting with a brake pedal, switch, and/or the like of operator station 120)). Additionally, or alternatively, ECM 180 may obtain information concerning a position of throttle valve 212, information concerning a load of the engine, information concerning an engine fuel amount (e.g., an amount of fuel available to the engine), information concerning a position of adjustable vanes of the VGT of engine system 200, information concerning a speed of the VGT, information concerning a speed of the machine 100, and/or the like.

ECM 180 may process the information concerning engine system 200 to determine one or more parameters. For example, ECM 180 may process (e.g., parse) the information concerning the exhaust gas temperature to determine the exhaust gas temperature. As another example, ECM 180 may process the information concerning the requested amount of engine braking power to determine the amount of engine braking power to reduce the speed of machine 100. In this way, ECM 180 may process the information concerning engine system 200 to determine the speed of the engine, the exhaust gas temperature, the engine airflow rate, the pressure of intake manifold 214, the requested amount of engine braking power, the position of throttle valve 212, the load of the engine, the engine fuel amount, the position of the adjustable vanes of the VGT, the speed of the VGT, the speed of the machine 100, and/or the like.

ECM 180 may evaluate the one or more parameters. For example, ECM 180 may determine whether the exhaust gas temperature satisfies (e.g., is greater than or equal to) an exhaust gas temperature threshold. The exhaust gas temperature threshold may be a minimum operating temperature of particulate collection device 224 and/or exhaust aftertreatment device 226 (e.g., a minimum operating temperature for particulate collection device 224 and/or exhaust aftertreatment device 226 to operate in an efficient and/or effective manner to remove and/or convert particulate matter and/or other emissions in the exhaust gas). In some implementations, ECM 180 may determine that the exhaust gas temperature satisfies the exhaust gas temperature threshold and may therefore determine to refrain from controlling any component of engine system 200 to change the exhaust gas temperature.

In some implementations, ECM 180 may determine that the exhaust gas temperature fails to satisfy the exhaust gas temperature threshold and therefore may evaluate one or more additional parameters to determine whether ECM 180 is to control one or more components of engine system 200 to change the exhaust gas temperature. For example, ECM 180 may determine whether the speed of the engine satisfies (e.g., is greater than or equal to) an engine speed threshold (e.g., an engine speed associated with production of nontrivial amounts of particulate matter and/or other emissions in exhaust gas, such as 1,200 RPMs), whether the engine airflow rate satisfies (e.g., is greater than or equal to) an engine airflow rate threshold (e.g., an engine airflow rate sufficient to create a backpressure associated with the engine), whether the pressure of intake manifold 214 satisfies (e.g., is greater than or equal to) an intake manifold pressure threshold (e.g., an intake manifold pressure associated with production of nontrivial amounts of particulate matter and/or other emissions in exhaust gas), and/or the like.

When the ECM 180 determines that the speed of the engine satisfies the engine speed threshold, the engine airflow rate satisfies the engine airflow rate threshold, the pressure of intake manifold 214 satisfies the intake manifold pressure threshold, and/or the like, ECM 180 may control the one or more components of engine system 200 to change the exhaust gas temperature. In some implementations, ECM 180 may control the VGT of engine system 200. For example, ECM 180 may cause the adjustable vanes of the VGT (e.g., of VGT turbine 222) to adjust from a first vane position to a second vane position (e.g., adjust from a closed vane position to an open vane position). This may restrict a flow of air in air induction system 206, which may cause the engine of engine system 200 to run rich and increase an operating temperature of the engine and thereby increase the exhaust gas temperature.

Additionally, or alternatively, ECM 180 may control throttle valve 212. For example, ECM 180 may cause throttle valve 212 to adjust from a first valve position to a second valve position (e.g., adjust from an open valve position to a closed valve position). Similar to controlling the VGT, this may restrict the flow of air in air induction system 206, which may cause the engine of engine system 200 to run rich and increase the operating temperature of the engine and thereby increase the exhaust gas temperature.

In some implementations, ECM 180 may control the VGT to increase the exhaust gas temperature and may subsequently control throttle valve 212 to further increase the exhaust temperature. In an example, ECM 180 may cause the adjustable vanes of the VGT to adjust, based on the exhaust gas temperature, the speed of the engine, the engine airflow rate, the pressure of the intake manifold, and/or the like, as described herein. After causing the adjustable vanes of the VGT to adjust, ECM 180 may obtain additional information concerning the exhaust gas temperature (e.g., at a second time after a first time when ECM 180 obtained the information concerning the exhaust gas temperature). ECM 180 may determine an updated exhaust gas temperature (e.g., a temperature of the exhaust gas at the second time) based on the additional information concerning the exhaust gas temperature, and may determine whether the updated exhaust gas temperature satisfies the exhaust gas temperature threshold.

ECM 180 may determine that the updated exhaust gas temperature satisfies the exhaust gas temperature threshold (e.g., the exhaust gas temperature is greater than or equal to a minimum operating temperature of particulate collection device 224 and/or exhaust aftertreatment device 226) and may determine to refrain from controlling any additional component of engine system 200 to change the exhaust gas temperature. Additionally, or alternatively, ECM 180 may determine that the updated exhaust gas temperature fails to satisfy the exhaust gas temperature threshold, and may determine to control throttle valve 212 to change the exhaust gas temperature. In such a scenario, ECM 180 may cause throttle valve 212 to adjust to increase the exhaust gas temperature, as described herein.

In some implementations, ECM 180 may determine whether to control one or more components of engine system 200 based on the requested amount of engine braking power. For example, ECM 180 may determine a target pressure of intake manifold 214 based on the requested amount of engine braking power (e.g., by searching a lookup table). ECM 180 may determine a difference between the target pressure of intake manifold 214 and the pressure of intake manifold 214 (e.g., determined from the information concerning the pressure of intake manifold 214). ECM 180 may control one or more components of engine system 200, such as the VGT and/or throttle valve 212, to change the pressure of intake manifold 214 based on the difference. For example, ECM 180 may cause the adjustable vanes of the VGT (e.g., of VGT turbine 222) to adjust and/or may cause throttle valve 212 to adjust. This may change a flow of air in air induction system 206 and thereby intake manifold 214, which may change the pressure of intake manifold 214.

ECM 180 may control the VGT to change the pressure of intake manifold 214, and may subsequently control throttle valve 212 to further change the pressure of intake manifold 214. In an example, ECM 180 may cause the adjustable vanes of the VGT to adjust based on the target pressure of intake manifold 214, the pressure of the intake manifold 214, and/or the like, as described herein. After causing the adjustable vanes of the VGT to adjust, ECM 180 may obtain additional information concerning the pressure of intake manifold 214 (e.g., at a second time after a first time when ECM 180 obtained the information concerning the pressure of intake manifold 214). ECM 180 may determine an updated pressure of intake manifold 214 (e.g., a pressure of intake manifold 214 at the second time) based on the additional information concerning the pressure of intake manifold 214, and may determine a difference between the target pressure of intake manifold 214 and the updated pressure of intake manifold 214. ECM 180 may determine, based on the difference, to control throttle valve 212 and may cause throttle valve 212 to adjust to change the pressure of intake manifold 214, as described herein.

In this way, ECM 180 may cause the adjustable vanes of the VGT (e.g., the adjustable vanes of VGT turbine 222) to adjust (e.g., from a first vane position to a second vane position) and/or may cause throttle valve 212 to adjust (e.g., from a first valve position to a second valve position) to cause the exhaust gas temperature to change and/or the pressure of intake manifold 214 to change.

While some implementations described herein concern ECM 180 causing the adjustable vanes of the VGT to adjust before causing the throttle valve 212 to adjust, implementations also include ECM 180 causing the throttle valve 212 to adjust before causing the adjustable vanes of the VGT to adjust to cause the exhaust gas temperature to change and/or the pressure of intake manifold 214 to change.

Additionally, or alternatively, while some implementations described herein concern ECM 180 causing the adjustable vanes of the VGT to adjust (e.g., from a first vane position to a second position), implementations also include ECM 180 causing one or more additional components of the VGT to adjust. For example, ECM 180 may cause an adjustable intake or an adjustable outlet of VGT turbine 222 to adjust. As another example, ECM 180 may cause an adjustable flow area control element of the VGT to adjust. Accordingly, the ECM 180 may cause the one or more additional components of the VGT to adjust when causing (or instead of causing) the adjustable vanes of the VGT to adjust.

The number and arrangement of devices and networks shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
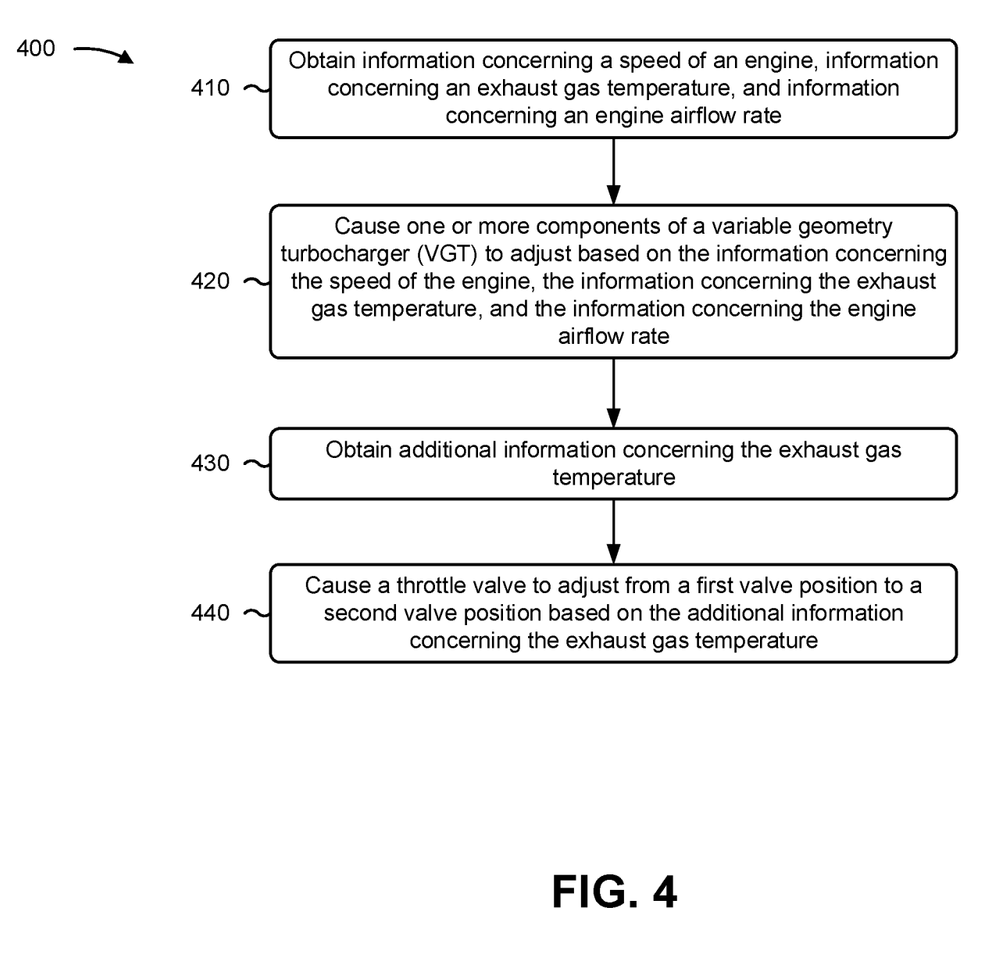
FIG. 4 is a flowchart of an example process for using a variable geometry turbocharger to control an exhaust gas temperature.

FIG. 4 is a flowchart of an example process 400 for using a VGT to control an exhaust gas temperature. In some implementations, one or more process blocks of FIG. 4 may be performed by an ECM (e.g., ECM 180). One or more process blocks of FIG. 4 may be performed by another device or a group of devices separate from or including the ECM, such as a control device (e.g., control device 310), a sensor (e.g., sensor 320), and/or the like.

As shown in FIG. 4, process 400 may include obtaining information concerning a speed of an engine, information concerning an exhaust gas temperature, and information concerning an engine airflow rate (block 410). For example, the ECM may obtain information concerning a speed of an engine, information concerning an exhaust gas temperature, and information concerning an engine airflow rate, as described above.

As further shown in FIG. 4, process 400 may include causing one or more components of a VGT to adjust based on the information concerning the speed of the engine, the information concerning the exhaust gas temperature, and the information concerning the engine airflow rate (block 420). For example, the ECM may cause one or more components of a VGT to adjust based on the information concerning the speed of the engine, the information concerning the exhaust gas temperature, and the information concerning the engine airflow rate, as described above.

As further shown in FIG. 4, process 400 may include obtaining additional information concerning the exhaust gas temperature (block 430). For example, the ECM may obtain additional information concerning the exhaust gas temperature, as described above.

As further shown in FIG. 4, process 400 may include causing a throttle valve to adjust from a first valve position to a second valve position based on the additional information concerning the exhaust gas temperature (block 440). For example, the ECM may cause a throttle valve to adjust from a first valve position to a second valve position based on the additional information concerning the exhaust gas temperature, as described above.

Process 400 may include additional implementations, such as any single implementation or any combination of implementations described in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
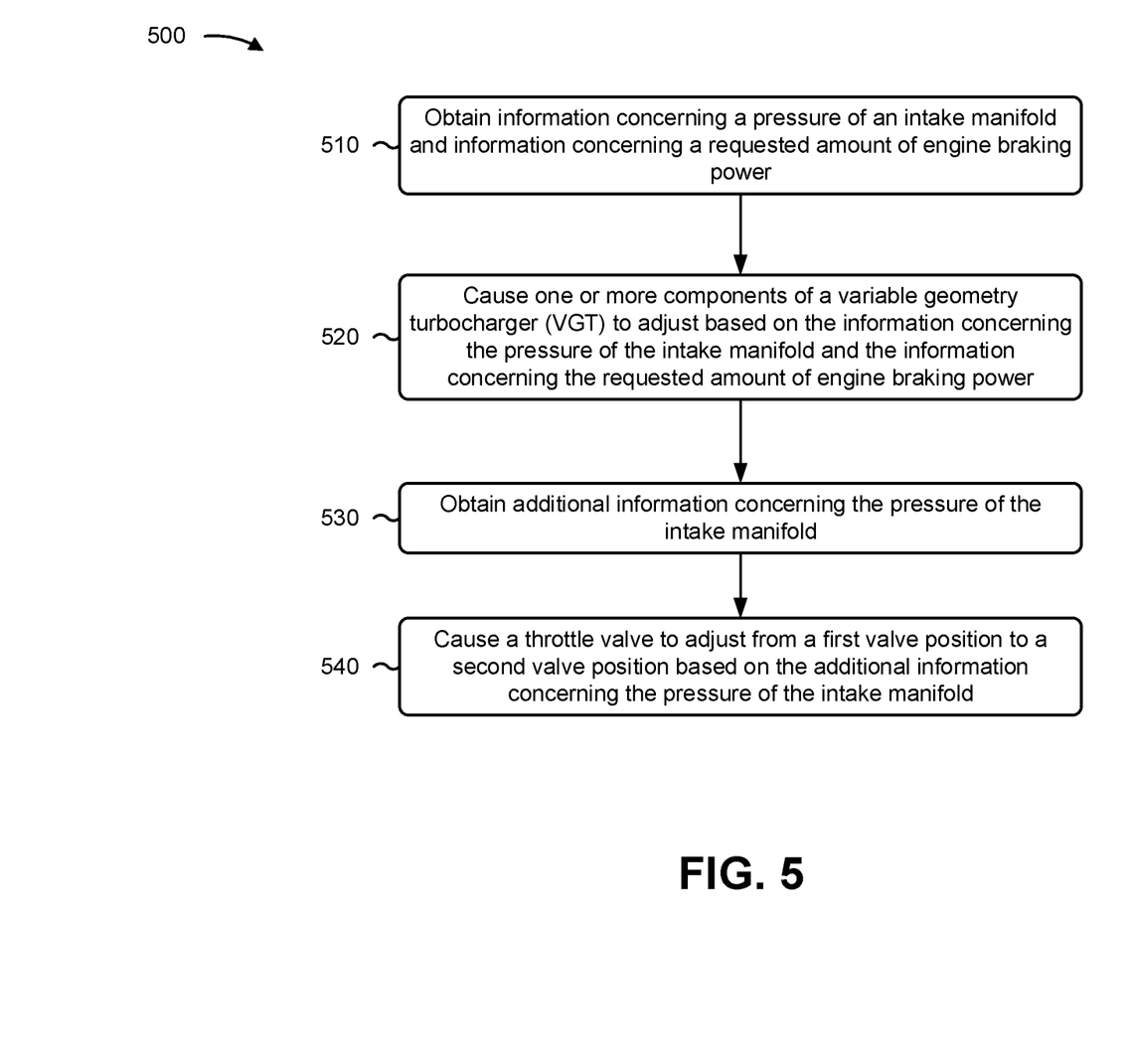
FIG. 5 is a flowchart of an example process for using a variable geometry turbocharger to control a pressure of an intake manifold.

FIG. 5 is a flowchart of an example process 500 for using a VGT to control a pressure of an intake manifold. In some implementations, one or more process blocks of FIG. 5 may be performed by an ECM (e.g., ECM 180). One or more process blocks of FIG. 5 may be performed by another device or a group of devices separate from or including the ECM, such as a control device (e.g., control device 310), a sensor (e.g., sensor 320), and/or the like.

As shown in FIG. 5, process 500 may include obtaining information concerning a pressure of an intake manifold and information concerning a requested amount of engine braking power (block 510). For example, the ECM may obtain information concerning a pressure of an intake manifold and information concerning a requested amount of engine braking power, as described above.

As further shown in FIG. 5, process 500 may include causing one or more components of a VGT to adjust based on the information concerning the pressure of the intake manifold and the information concerning the requested amount of engine braking power (block 520). For example, the ECM may cause one or more components of a VGT to adjust based on the information concerning the pressure of the intake manifold and the information concerning the requested amount of engine braking power, as described above.

As further shown in FIG. 5, process 500 may include obtaining additional information concerning the pressure of the intake manifold (block 530). For example, the ECM may obtain additional information concerning the pressure of the intake manifold, as described above.

As further shown in FIG. 5, process 500 may include causing a throttle valve to adjust from a first valve position to a second valve position based on the additional information concerning the pressure of the intake manifold (block 540). For example, the ECM may cause a throttle valve to adjust from a first valve position to a second valve position based on the additional information concerning the pressure of the intake manifold, as described above.

Process 500 may include additional implementations, such as any single implementation or any combination of implementations described in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The above-described techniques allow an ECM of an engine to control a VGT and/or a throttle valve of the engine. In this way, the ECM may manage an exhaust gas temperature to allow a particulate collection device and/or an aftertreatment device of the engine to remove and/or convert particulate matter and/or other emissions in the exhaust gas. This may be particularly beneficial in situations when the engine cannot generate sufficiently hot exhaust gas, such as in low ambient temperatures or when the engine is idle. The ECM may cause the VGT and/or the throttle valve to adjust only when the exhaust gas temperature fails to satisfy an engine temperature threshold and other parameters indicate normal operation of the engine. Thus, some techniques described herein improve longevity of the particulate collection device, the aftertreatment device, and/or other components of the engine by increasing the exhaust gas temperature only when needed.

Furthermore, the ECM may manage a pressure of an intake manifold of the engine to facilitate engine braking. This may be particularly beneficial in situations when the engine cannot generate a sufficient pressure in the engine (e.g., to slow movement of pistons in the engine) using typical engine braking techniques (e.g., by restricting a flow of the exhaust gas from the engine to create the pressure in the engine).

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A device, comprising:
   one or more memories; and
   one or more processors configured to:
   identify information associated with operation of an engine,
      wherein the information associated with operation of the engine includes at least one of:
         information concerning a speed of the engine,
         information concerning an exhaust gas temperature,
         information concerning an engine airflow rate, or
         information concerning a pressure of an intake manifold associated with the engine;

determine, based on the information concerning the exhaust gas temperature, that the exhaust gas temperature fails to satisfy an exhaust gas temperature threshold;

determine that a first condition associated with operation of the engine is satisfied based on determining that the exhaust gas temperature fails to satisfy the exhaust gas temperature threshold and based on at least one of the information concerning the speed of the engine, the information concerning the engine airflow rate, or the information concerning the pressure of the intake manifold associated with the engine;

determine that a second condition associated with operation of the engine is satisfied based on determining that the exhaust gas temperature fails to satisfy the exhaust gas temperature threshold and based on at least one of the information concerning the speed of the engine, the information concerning the exhaust gas temperature, the information concerning the engine airflow rate, or the information concerning the pressure of the intake manifold associated with the engine; and send, based on determining that the first condition is satisfied and determining that the second condition is satisfied, one or more commands to selectively control adjustment of a throttle valve associated with the engine and a variable geometry turbocharger (VGT) associated with the engine.

2. The device of claim 1, wherein the one or more processors, when determining that the second condition is satisfied, are configured to:
determine, based on the information concerning the exhaust gas temperature, that an updated exhaust gas temperature fails to satisfy the exhaust gas temperature threshold; and
determine, based on determining that the updated exhaust gas temperature fails to satisfy the exhaust gas temperature threshold, that the first condition is satisfied.

3. The device of claim 1, wherein the one or more processors, when determining that the second condition is satisfied, are configured to:
determine, based on the information concerning the speed of the engine, that the speed of the engine satisfies an engine speed threshold; and
determine, based on determining that the speed of the engine satisfies the engine speed threshold, that the second condition is satisfied.

4. The device of claim 1, wherein the one or more processors, when determining that the second condition is satisfied, are configured to:
determine, based on the information concerning the engine airflow rate, that the engine airflow rate satisfies an engine speed threshold; and
determine, based on determining that the engine airflow rate satisfies the engine speed threshold, that the second condition is satisfied.

5. The device of claim 1, wherein the one or more processors, when determining that the first condition is satisfied, are configured to:
determine, based on the information concerning the engine airflow rate, that the first condition is satisfied.

6. The device of claim 5, wherein the one or more processors, when determining that the second condition is satisfied, are configured to:
determine, based on the information concerning the speed of the engine, that the second condition is satisfied.

7. The device of claim 5, wherein the one or more processors, when determining that the second condition is satisfied, are configured to:
determine, based on the information concerning the exhaust gas temperature, that the second condition is satisfied.

8. The device of claim 5, wherein the one or more processors, when determining that the second condition is satisfied, are configured to:
determine, based on the information concerning the pressure of the intake manifold associated with the engine, that the second condition is satisfied.

9. The device of claim 1, wherein sending the one or more commands to selectively control adjustment of the throttle valve associated with the engine and the VGT associated with the engine causes at least one of:
adjustment of an adjustable intake of the VGT;
adjustment of an adjustable outlet of the VGT; or
adjustment of an adjustable flow area control element of the VGT.

10. The device of claim 1, wherein sending the one or more commands to selectively control adjustment of the throttle valve associated with the engine and the VGT associated with the engine causes the throttle valve to adjust from a first valve position to a second valve position.

11. A device, comprising:
one or more memories; and
one or more processors configured to:
identify information associated with operation of an engine,
wherein the information associated with operation of the engine includes at least one of:
information concerning a speed of the engine,
information concerning an exhaust gas temperature,
information concerning an engine airflow rate, or
information concerning a pressure of an intake manifold associated with the engine;
determine, based on the information concerning the exhaust gas temperature, that the exhaust gas temperature fails to satisfy an exhaust gas temperature threshold;
determine that a first condition associated with operation of the engine is satisfied based on determining that the exhaust gas temperature fails to satisfy the exhaust gas temperature threshold and based on at least one of the information concerning the speed of the engine, the information concerning the engine airflow rate, or the information concerning the pressure of the intake manifold associated with the engine;
determine that a second condition associated with operation of the engine is satisfied based on determining that the exhaust gas temperature fails to satisfy the exhaust gas temperature threshold and based on at least one of the information concerning the speed of the engine, the information concerning the exhaust gas temperature, the information concerning the engine airflow rate, or the information concerning the pressure of the intake manifold associated with the engine; and
control, based on determining that the first condition is satisfied and determining that the second condition is satisfied, adjustment of a throttle valve associated with the engine.

12. The device of claim 11, wherein the one or more processors, when determining that the second condition is satisfied, are configured to:
  determine, based on the information concerning the exhaust gas temperature, that an updated exhaust gas temperature fails to satisfy the exhaust gas temperature threshold; and
  determine, based on determining that the updated exhaust gas temperature fails to satisfy the exhaust gas temperature threshold, that the first condition is satisfied.

13. The device of claim 11, wherein the one or more processors, when determining that the second condition is satisfied, are configured to:
  determine, based on the information concerning the speed of the engine, that the speed of the engine satisfies an engine speed threshold; and
  determine, based on determining that the speed of the engine satisfies the engine speed threshold, that the second condition is satisfied.

14. The device of claim 11, wherein the one or more processors, when determining that the second condition is satisfied, are configured to:
  determine, based on the information concerning the engine airflow rate, that the engine airflow rate satisfies an engine speed threshold; and
  determine, based on determining that the engine airflow rate satisfies the engine speed threshold, that the second condition is satisfied.

15. The device of claim 11, wherein the one or more processors, when determining that the first condition is satisfied, are configured to:
  determine, based on the the information concerning the engine airflow rate, that the first condition is satisfied.

16. The device of claim 15, wherein the one or more processors, when determining that the second condition is satisfied, are configured to:
  determine, based on the information concerning the speed of the engine, that the second condition is satisfied.

17. The device of claim 11, wherein controlling adjustment of the throttle valve causes the throttle valve to adjust from a first valve position to a second valve position.

18. The device of claim 15, wherein the one or more processors, when determining that the second condition is satisfied, are configured to:
  determine, based on the information concerning the pressure of the intake manifold associated with the engine, that the second condition is satisfied.

19. The device of claim 15, wherein the one or more processors, when determining that the second condition is satisfied, are configured to:
  determine, based on the information concerning the exhaust gas temperature, that the second condition is satisfied.

20. The device of claim 11, wherein the one or more processors are further configured to:
  control, based on determining that the first condition is satisfied and that the second condition is satisfied, adjustment of a variable geometry turbocharger (VGT) associated with the engine.

* * * * *